Jan. 21, 1958      C. E. TACK      2,820,529

HAND BRAKE LINKAGE

Filed March 29, 1955

INVENTOR.
Carl E. Tack
BY
Walter L. Schlegel, Jr. Atty.

Witness:
Ralph M. Faust

United States Patent Office 2,820,529
Patented Jan. 21, 1958

2,820,529

HAND BRAKE LINKAGE

Carl E. Tack, Chicago, Ill., assignor to American Steel Foundries, Chicago, Ill., a corporation of New Jersey Application March 29, 1955, Serial No. 497,596

8 Claims. (Cl. 188—59)

This invention relates to railway brakes and more particularly to improvements in off-wheel hand brake arrangements.

It is an object of this invention to provide a hand brake which is compact and economical and which may be readily assembled and disassembled to facilitate installation and servicing.

Another object of the invention is to provide a hand brake arrangement wherein the braking forces on the rotor are equalized on both sides thereof without regard to unequal brake shoe wear.

Another specific object of the invention is to provide a hand brake arrangement which will not adversely affect the normal operation of the air actuated brakes.

Figure 1:
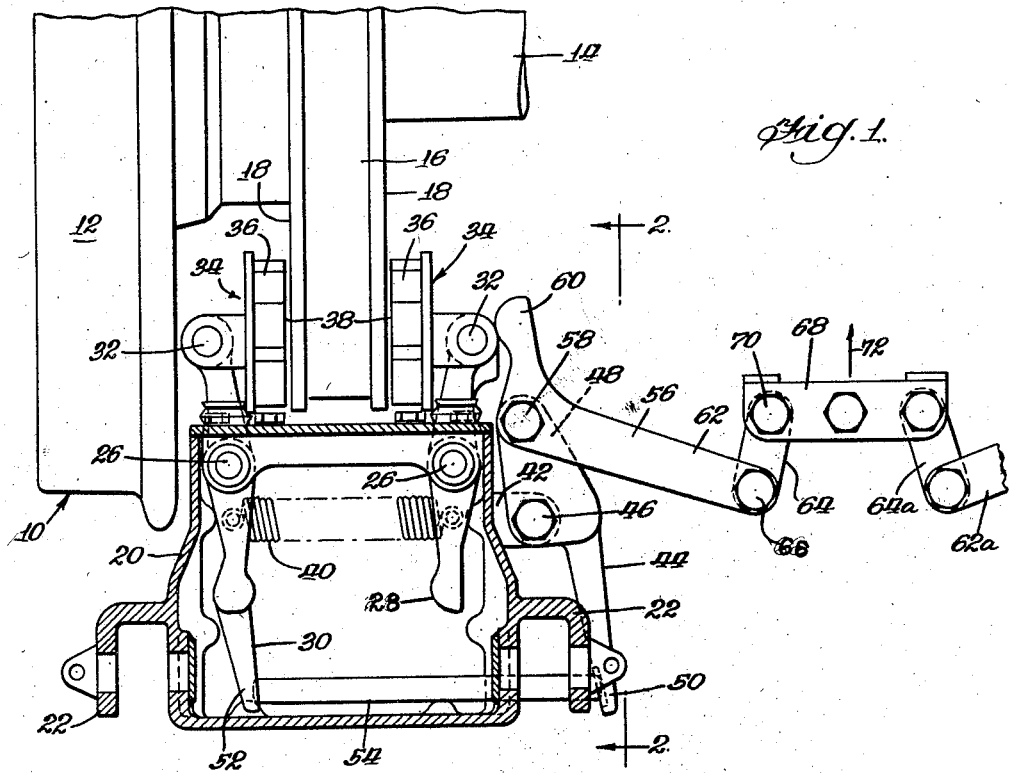
Figure 2:
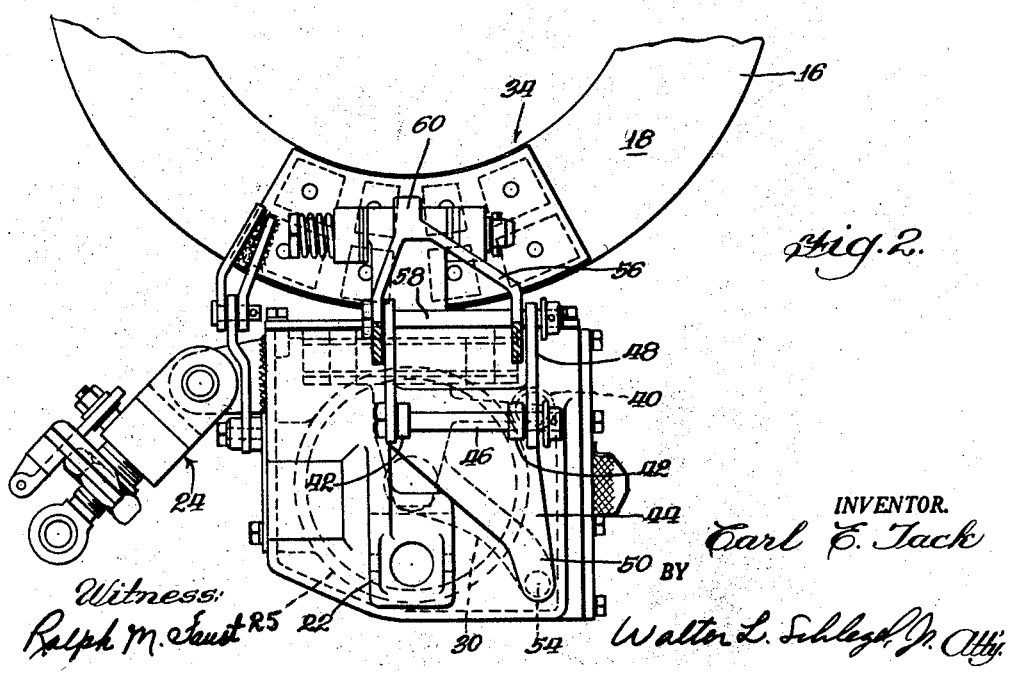

These and other objects of the invention will be apparent from the specification and the drawings in which Figure 1 is a plan view partially in section of the preferred embodiment of the invention, and Figure 2 is a side elevational view taken at the line 2—2 of Figure 1.

The hand brake arrangement described herein is particularly adaptable to railway cars having a truck structure spring-supported by a wheel and axle assembly. Inasmuch as this type of railway car is well known to those acquainted with this field, it is not deemed necessary to either describe the car or show it in the drawings. The wheel and axle assembly 10 consists of a wheel 12 rigidly secured to and rotatable with an axle 14. Mounted on the axle and rotatable with the wheel is a friction disk or rotor 16 having opposed friction faces 18 extending substantially radially of the axis of rotation of the wheel and axle assembly. Immediately adjacent the rotor, a cylinder housing 20 is secured to a portion of the truck frame (not shown) in any of several usual manners. In the embodiment shown, the means of attachment consists of a pair of lugs 22 and an adjustor assembly shown generally at 24 which not only serves as one of the points of suspension, but also may be used to obtain proper alignment of the brake assembly which will be described hereinafter. Mounted in the cylinder housing is a fluid responsive cylinder 25 which would normally engage and actuate the brake levers when a braking effect is desired but which would be inactive when the hand brake was to be used. The cylinder housing also acts as a support for various parts of the hand brake arrangement. Pivotally mounted to the cylinder housing 20 by means of pivot pins 26 are a short brake lever 28 and a long brake lever 30. Both brake levers extend forwardly of the cylinder housing to a point adjacent the brake surfaces 18 of the rotor 16. Pivotally attached to the brake levers at 32 are brake assemblies 34, each of which carries a brake shoe 36 having a friction surface 38 which is engageable with an associated brake surface of the rotor upon actuation of the brake mechanism. Connecting the brake levers at a point rearward of their pivot pins is a release spring 40 which constantly urges the brake shoes away from and out of engagement with the brake surfaces of the rotor. It should be noted that both brake levers are identical with the exception that the long brake lever has an extension rearwardly and downwardly inside the cylinder housing for a purpose to be hereinafter described.

A pair of lugs 42 are secured to the cylinder housing on the side adjacent the short brake lever 28. Pivotally attached to these lugs by means of a pivot pin 46 is a fulcrum bar 44 which is disposed in substantially parallel relationship to the short brake lever 28. The fulcrum bar 44 has a forwardly extending portion 48 terminating at a point between the pivot pin 46 and the friction means of the short lever 28, and a rearward end 50 which is engageable with a push rod 54 slidably received in the cylinder housing 20 transversely thereof. The push rod 54 extends partially through the housing to a point immediately adjacent the rearward extension 52 of the long brake lever 30 and is engageable therewith. It is apparent that any pivotal rotation of the fulcrum bar 44 will be transmitted through the push rod 54 to the long brake lever 30. This pivotal motion of the long brake lever 30 will be in the same direction as the pivotal motion of the fulcrum bar 44.

Pivotally attached to the forwardly extending end 48 of the fulcrum bar 44 by means of a pivot pin 58 is a live lever 56 having a short arm 60 and a long arm 62. The short arm 60 of the live lever is engageable with the forward end of the short brake lever 28 such that counterclockwise rotation (as viewed in Figure 1) of the live lever will urge the short lever to pivot, also in a counterclockwise direction, and will thereby urge the brake means of the short lever into engagement with its associated brake surface 18 of the rotor 16. At the time of this engagement, the end of the short arm 60 will be restrained from further movement and the live lever 56 will then rotate about the end of arm 60 as a fulcrum point thereby moving pivot pin 58 and the forward end 48 of the fulcrum bar 44 outward or away from the cylinder housing 20. This latter movement imparts a clockwise pivotal motion to the fulcrum bar 44 about pin 46 and this clockwise pivotal motion is transmitted through the push rod 54 to the long brake lever 30 overcoming the resistance of the release spring 40 and urging the brake means 34 of the long lever into engagement with its associated brake surface 18 of the rotor 16. It is readily seen, therefore, that the braking forces acting on opposed faces of the rotor are effectively equalized through the hand brake linkage.

The long arm 62 of the live lever 56 is pivotally attached to the connection strap 64 by means of a pivot pin 66. The connection strap in turn is pivotally mounted to an equalizer bar 68 by means of a pivot pin 70. All of the mechanism thus far described is preferably duplicated on the opposite side of the wheel and axle assembly, and this second mechanism is connected in a similar manner to the equalizer bar 68. Inasmuch as the assemblies are identical, it is not deemed necessary to duplicate these parts in the drawings and only the connection strap 64a and a portion of the live lever 62a of the duplicated brake assembly are shown. The original hand braking effort is applied to the equalizer bar 68 by any of several means well known in the art. Inasmuch as these means form no part of the present invention they have not been illustrated on the accompanying drawings.

Reviewing the action of the hand brake, and referring generally to Figure 1, motion of the equalizer bar 68 in the direction indicated by an arrow 72 will actuate the live lever 56 to pivot in a counterclockwise direction about the pin 58. At this time, the long lever 30 and the fulcrum bar 44 will be restrained by the release spring 40, and the short arm 60 of the live lever, which is engageable with the outer end of the short brake lever 28, will pivot the lever 28 in a counterclockwise direction whereby the friction means 38 will be urged into braking engagement with the associated brake surface 18 of the rotor 16. With termination of this motion by the braking engagement, and with continued actuation of the live lever, the live lever will begin to fulcrum about the engagement point of the short arm 60 and the brake lever 28, still in a counterclockwise direction, and the forward end of the fulcrum bar, which is located between the fulcrum of the bar and the friction means of the short brake lever, will move in a clockwise direction. The inner end 50 of the bar 44, which is in engagement with rod 54, will urge the rod to the left. The rod, being in engagement with the inner end 52 of the long lever 30, will in turn pivot the long lever in a clockwise direction overcoming the force of the release spring and will thereby urge the friction means of the long lever into engagement with the associated brake surface of the rotor 16.

It should be noted that the action of the hand brake arrangement in no way adversely affects the action of the fluid responsive cylinder when the brakes are actuated by the latter means. Conversely the actuation of the brakes by means of the cylinder can in no way affect the hand brake linkage. Furthermore, the braking forces are effectively equalized, not only on opposed sides of the rotor 16, but are also equalized in relation to the similar brake assembly on the opposite end of the wheel and axle assembly 10. This equalization throughout the entire hand brake arrangement not only occurs when the brake shoes are new, but will also occur just as effectively in the event of uneven wear of the brake shoes or the brake surfaces of the rotors.

I claim:

1. In a brake arrangement for a railway car having a truck structure spring-supported by a wheel and axle assembly having opposed brake surfaces rotatable with said wheel; a cylinder housing supported by said structure, a fluid responsive cylinder carried in said housing, a pair of brake levers fulcrumed on said housing and embracing said surfaces, said levers being operatively associated with said cylinder for actuation thereby, friction means carried by said levers and engageable with said surfaces, resilient means operatively connecting said levers and constantly urging said friction means out of engagement with said brake surfaces, a fulcrum bar pivotally connected intermediate its ends to said housing and disposed adjacent and substantially parallel to one of said levers, a live lever pivotally mounted on said bar at the end of the bar closer to said friction means than the other end of said bar, said live lever having an arm operatively engageable with said one lever to urge the friction means of said one lever into braking engagement with its associated brake surface when said live lever is actuated, a push rod engageable with other end of said bar, said rod being slidably mounted in said housing and extending transversely therethrough to a point adjacent the other of said levers whereby the friction means of said other lever will be urged into engagement with its associated brake surface upon actuation of said live lever.

2. In a brake arrangement for a railway car having a truck structure spring-supported by a wheel and axle assembly having opposed brake surfaces rotatable with said wheel, a cylinder housing, opposed brake levers pivoted in said housing, friction means carried on the outer end of said levers and engageable with said brake surfaces, a bar fulcrumed intermediate its ends on said housing and disposed adjacent one of said levers, a rod slidably mounted in said housing and operatively engageable with the inner end of said bar and the inner end of the other of said levers whereby pivotal motion of said bar will impart pivotal motion to said other lever in the same direction, and a live lever pivotally carried on the outer end of said bar and operatively associated with said one lever whereby actuation of said live lever will pivot said one lever and said bar in opposite directions.

3. A hand brake arrangement for a railway car having a truck structure spring-supported by a wheel and axle assembly having opposed brake surfaces rotatable with said wheel comprising a support secured to said truck, a short and a long brake lever pivoted to said support, said levers having friction means engageable with said brake surfaces, a bar fulcrumed intermediate its ends to said support and disposed adjacent and substantially parallel to said short lever, a live lever pivoted to one end of said bar and having an arm operatively engageable with said short lever whereby upon actuation of said live lever, said short lever will be pivoted in one direction and said bar will be pivoted in a direction opposite thereto, and means operatively connecting the other end of the bar and the long lever whereby pivotal motion of the bar will be transmitted to the long lever.

4. In a brake arrangement for a railway car having a truck structure spring-supported by a wheel and axle assembly having opposed brake surfaces rotatable with the wheel, opposed pivotal brake levers having friction means engageable with said brake surfaces, a fulcrum bar fulcrumed intermediate its ends and disposed adjacent and generally parallel to one of said levers, a live lever pivotally connected to said bar at a point between the fulcrum of the bar and the friction means, said live lever having an arm engageable with said one lever whereby when said live lever is actuated, said one lever will pivot to urge its friction means into engagement with its associated brake surface and said bar will pivot in a direction opposite thereto, and a rod connected between said bar and other of said brake levers to urge its friction means into engagement with its associated brake surface, the point of connection between the bar and rod being on the side of the fulcrum of the bar remote from the connection between the bar and the live lever.

5. In a brake arrangement for a railway car having a truck structure spring-supported by a wheel and axle assembly having opposed brake surfaces rotatable with said wheel, opposed pivotal brake levers having friction means engageable with said surfaces, a fulcrum bar fulcrumed intermediate its ends and disposed adjacent one of said levers, a live lever pivotally carried by one end of said bar and engageable with said one lever whereby actuation of said live lever will pivot said one lever and said fulcrum bar in opposite directions, and means operatively connecting the other end of said fulcrum bar and the other of said levers to impart movement of said bar to said other lever to urge its friction means into engagement with its associated brake surface.

6. In a hand brake arrangement for a vehicle having a wheel and axle assembly, brake surfaces rotatable with said wheel, opposed pivotal brake levers having friction means engageable with said brake surfaces, a fulcrum bar adjacent and substantially parallel to one of said levers, a live lever pivotally carried by one end of said bar and engageable with said one lever, and means operatively connecting the other end of said fulcrum bar to the other of said levers.

7. In a hand brake arrangement for a vehicle having a wheel and axle assembly, brake surfaces rotatable with said wheel, opposed pivotal dead brake levers having friction means engageable with said surfaces, and means operatively engageable with said levers to urge said friction means simultaneously into engagement with said brake surfaces, said means comprising a fulcrum bar fulcrumed intermediate its ends and operatively connected at one end thereof to one of said dead levers, and a live lever pivoted to said bar at the other end of the bar and engageable with the other of said dead levers.

8. In a brake arrangement for a railway car having a truck structure spring-supported by a wheel and axle assembly, opposed brake surfaces rotatable with said wheel, a cylinder housing supported by said structure, opposed pivotal dead brake levers carried in said housing and having friction means engageable with said surfaces when said brake levers are pivoted in opposite directions, lever means adjacent and operatively connected to one of said dead brake levers for imparting pivotal motion thereto in a given direction, and additional means operatively associated with said last mentioned means and partially receivable within said housing for imparting pivotal motion to the other of said levers in a direction opposite to said given direction.

References Cited in the file of this patent

UNITED STATES PATENTS

| | | |
|---|---|---|
| 2,375,152 | Turner | May 1, 1945 |
| 2,383,376 | Gaenssle | Aug. 21, 1945 |
| 2,667,946 | Helsten | Feb. 2, 1954 |
| 2,713,400 | Coskun | July 19, 1955 |